(12) United States Patent
Kupritz et al.

(10) Patent No.: US 11,620,696 B2
(45) Date of Patent: Apr. 4, 2023

(54) DYNAMIC ORDER PRIORITIZATION ENABLEMENT

(71) Applicant: International Business Machines Corporation, Armonk, NY (US)

(72) Inventors: Noah Samuel Kupritz, Austin, TX (US); Tyler Watson, Austin, TX (US); Jennifer Erin Lanier, Austin, TX (US); Steven Garrett Raden, Austin, TX (US); Janelle Michiko Janyen Arita, Austin, TX (US); Samuel Griffiths, Austin, TX (US); Dylan Dotolo, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 170 days.

(21) Appl. No.: 16/733,765

(22) Filed: Jan. 3, 2020

(65) Prior Publication Data
US 2021/0209670 A1 Jul. 8, 2021

(51) Int. Cl.
  *G06Q 30/06* (2023.01)
  *G06Q 30/0601* (2023.01)
(52) U.S. Cl.
  CPC ..... *G06Q 30/0641* (2013.01); *G06Q 30/0633* (2013.01); *G06Q 30/0635* (2013.01)
(58) Field of Classification Search
  CPC ......... G06Q 30/06–0645; G06Q 30/08; G16Y 10/00–90
  USPC ........................................................ 705/27.1
  See application file for complete search history.

(56) References Cited

U.S. PATENT DOCUMENTS

| | | | |
|---|---|---|---|
| 7,216,298 B1 | 5/2007 | Ballard | |
| 7,328,171 B2 * | 2/2008 | Helot | G06Q 10/087 |
| | | | 705/27.2 |
| 7,620,647 B2 | 11/2009 | Stephens | |
| 7,620,894 B1 | 11/2009 | Kahn | |

(Continued)

FOREIGN PATENT DOCUMENTS

| | | | | |
|---|---|---|---|---|
| JP | 6498725 B2 * | 4/2019 | | B60K 35/00 |
| WO | 2018063474 A1 | 4/2018 | | |
| WO | WO-2021144911 A * | 7/2021 | | |

OTHER PUBLICATIONS

A. Ali, Y. Hafeez, S. Hussain and S. Yang, "Role of Requirement Prioritization Technique to Improve the Quality of Highly-Configurable Systems," in IEEE Access, vol. 8, pp. 27549-27573, 2020, doi: 10.1109/ACCESS.2020.2971382 (Year: 2020).*

(Continued)

*Primary Examiner* — Adam L Levine
(74) *Attorney, Agent, or Firm* — VanLeeuwen & VanLeeuwen; Kimberly Zillig

(57) ABSTRACT

An approach is provided in which the approach arranges a first parameter group and a second parameter group in an initial priority order on a user interface. The first parameter group includes a selection of a first parameter option that generates a restriction on a second parameter option included in the second parameter group. In response to receiving a user input, the approach dynamically modifies the user interface by rearranging the first parameter group and the second parameter group into a different priority order and removes the restriction on the second parameter option based on the different priority order.

17 Claims, 9 Drawing Sheets

(56) References Cited

U.S. PATENT DOCUMENTS

| | | | |
|---|---|---|---|
| 8,150,662 B2 | 4/2012 | Jain | |
| 9,152,434 B2 | 10/2015 | Mayer-Ullmann | |
| 9,400,855 B2* | 7/2016 | Bumbalough | G06F 30/13 |
| 9,407,698 B1 | 8/2016 | Latif | |
| 9,552,147 B2 | 1/2017 | Matas | |
| 9,690,447 B2 | 6/2017 | Ording | |
| 2003/0043192 A1 | 3/2003 | Bouleau | |
| 2009/0307576 A1 | 12/2009 | Thomson | |
| 2011/0276918 A1* | 11/2011 | Bennett | G06F 3/0482 715/811 |
| 2012/0005044 A1* | 1/2012 | Coleman | G06Q 30/02 705/27.2 |
| 2012/0036462 A1 | 2/2012 | Schwartz | |
| 2012/0330778 A1* | 12/2012 | Eastham | G06Q 30/02 705/26.7 |
| 2013/0111382 A1 | 5/2013 | Glaza | |
| 2013/0145296 A1 | 6/2013 | Stecher | |
| 2013/0232037 A1* | 9/2013 | Edwards | G06Q 30/0641 705/27.1 |
| 2019/0045250 A1* | 2/2019 | Shapiro | H04N 21/4755 |
| 2020/0184394 A1* | 6/2020 | Delacourt | G06Q 10/00 |

OTHER PUBLICATIONS

Aragones et al., "An Ontology-Based Architecture for Adaptive Work-Centered User Interface Technology," ip.com, IPCOM000134526D, Mar. 2006, 140 pages.

Grundy et al., "Developing Adaptable User Interfaces for Component-Based Systems," Interacting with computers, 14(3), 2002, pp. 175-194.

Roscher et al., "Dynamic Distribution and Layouting of Model-Based User Interfaces in Smart Environments," In Model-Driven Development of Advanced User Interfaces, Springer, Berlin, Heidelberg, 2011, pp. 171-197.

* cited by examiner

DYNAMIC ORDER PRIORITIZATION ENABLEMENT

BACKGROUND

Many businesses allow customers to customize a product or service by allowing the customers to select various product options according to their needs (e.g., processor type, memory size, etc.). To maintain high customer satisfaction, the businesses attempt to provide as many variants of a product as possible to meet customer needs. Products with variants are products that have similarities (e.g., based on the same model), but differ in some aspects from one another. Although a business would like to provide all product variant options, a business typically provides a subset of product variant options based on popularity, physical limitations, support limitations, and or inventory management.

When a customer is in process of placing an order for a product or service having product variant options, some selection options may be dependent upon other selection options according to the business' available product variant options and/or current inventory. For example, white interior trim in a new car may only be available with certain exterior trim colors. As a result, a customer may run into issues when the customer unintentionally limits or removes option selections that are a priority to the customer because of a selection that the customer previously entered.

BRIEF SUMMARY

According to one embodiment of the present disclosure, an approach is provided in which the approach arranges a first parameter group and a second parameter group in an initial priority order on a user interface. The first parameter group includes a selection of a first parameter option that generates a restriction on a second parameter option included in the second parameter group. In response to receiving a user input, the approach dynamically modifies the user interface by rearranging the first parameter group and the second parameter group into a different priority order and removes the restriction on the second parameter option based on the different priority order.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

Figure 1:
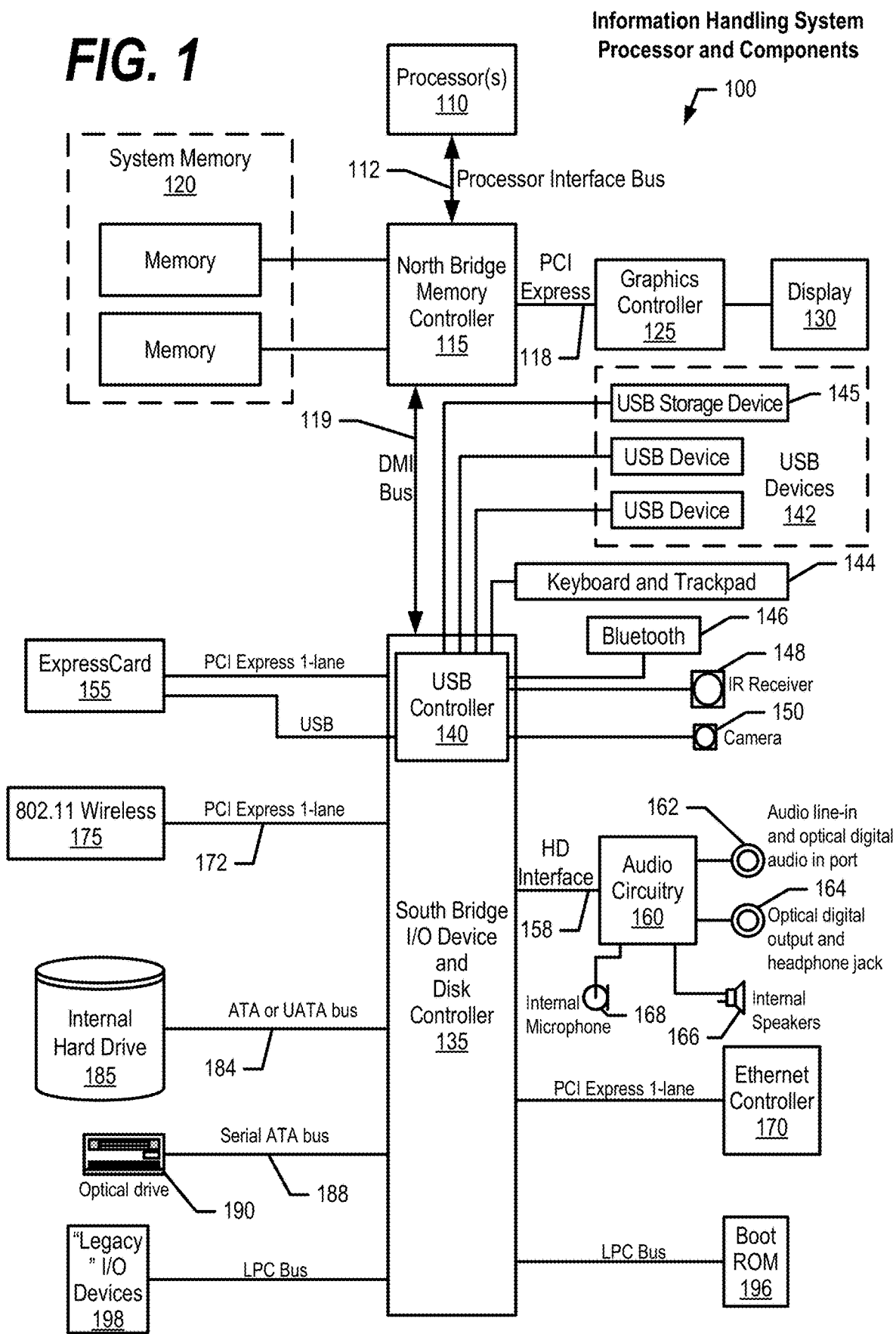
FIG. 1 is a block diagram of a data processing system in which the methods described herein can be implemented.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, Peripheral Component Interconnect (PCI) Express bus 118 connects Northbridge 115 to graphics controller 125. Graphics controller 125 connects to display device 130, such as a computer monitor.

Northbridge 115 and Southbridge 135 connect to each other using bus 119. In some embodiments, the bus is a Direct Media Interface (DMI) bus that transfers data at high speeds in each direction between Northbridge 115 and Southbridge 135. In some embodiments, a PCI bus connects the Northbridge and the Southbridge. Southbridge 135, also known as the Input/Output (I/O) Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and Universal Serial Bus (USB) connectivity as it connects to Southbridge 135 using both the USB and the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, Integrated Services Digital Network (ISDN) connectors, fax, printers, USB hubs, and many other types of USB connected devices. While removable nonvolatile storage device 145 is shown as a USB-connected device, removable nonvolatile storage device 145 could be connected using a different interface, such as a Firewire interface, and etcetera.

Wireless Local Area Network (LAN) device 175 connects to Southbridge 135 via the PCI or PCI Express bus 172. LAN device 175 typically implements one of the Institute of Electrical and Electronic Engineers (IEEE) 802.11 standards of over-the-air modulation techniques that all use the same protocol to wirelessly communicate between information handling system 100 and another computer system or device. Optical storage device 190 connects to Southbridge 135 using Serial Analog Telephone Adapter (ATA) (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality associated with audio hardware such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, Automated Teller Machine (ATM), a portable telephone device, a communication device or other devices that include a processor and memory.

Figure 2:
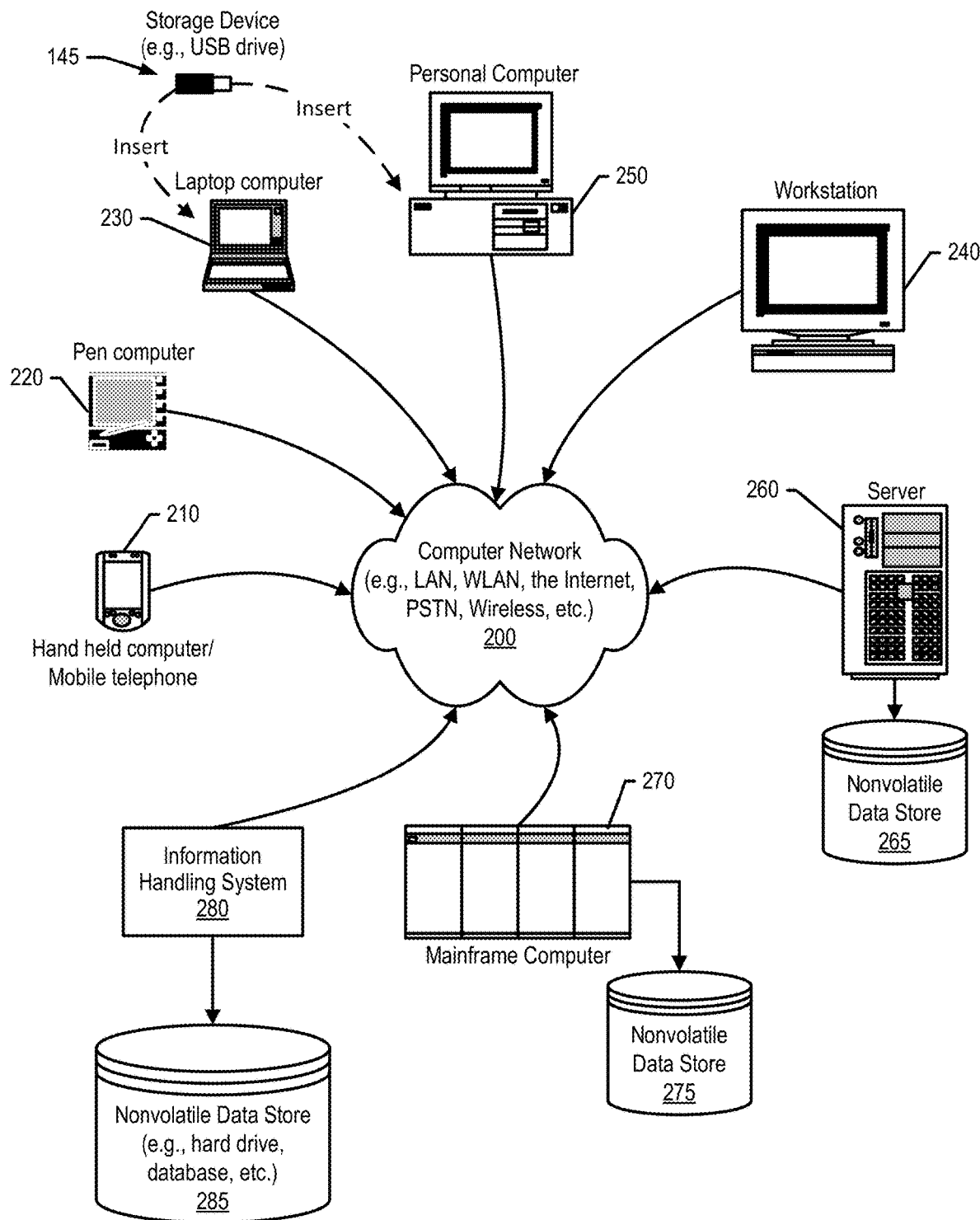
FIG. 2 provides an extension of the information handling system environment shown in FIG. 1 to illustrate that the methods described herein can be performed on a wide variety of information handling systems which operate in a networked environment.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as Moving Picture Experts Group Layer-3 Audio (MP3) players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. The embodiment of the information handling system shown in FIG. 2 includes separate nonvolatile data stores (more specifically, server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

As discussed above, customers often run into issues when ordering a product or service when they unintentionally limit or remove selections for fields that are a priority because of a selection they've previously entered. FIGS. 3 through 9 depict an approach that can be executed on an information handling system that resolves dependency-based restrictions by providing a user interface that indicates whether a current user selection limits the amount of future user selections as the user proceeds through an ordering process. The approach enables users to dynamically modify the layout of their user interface to remove the dependency-based restrictions based on their preferences and priorities. In addition, the approach provides the user with clear explanations and directions to dependent attributes on a form, which reduces the likelihood that the user is caught in a state of confusion when the user is unable to find options only available with different prior selections.

Figure 3:
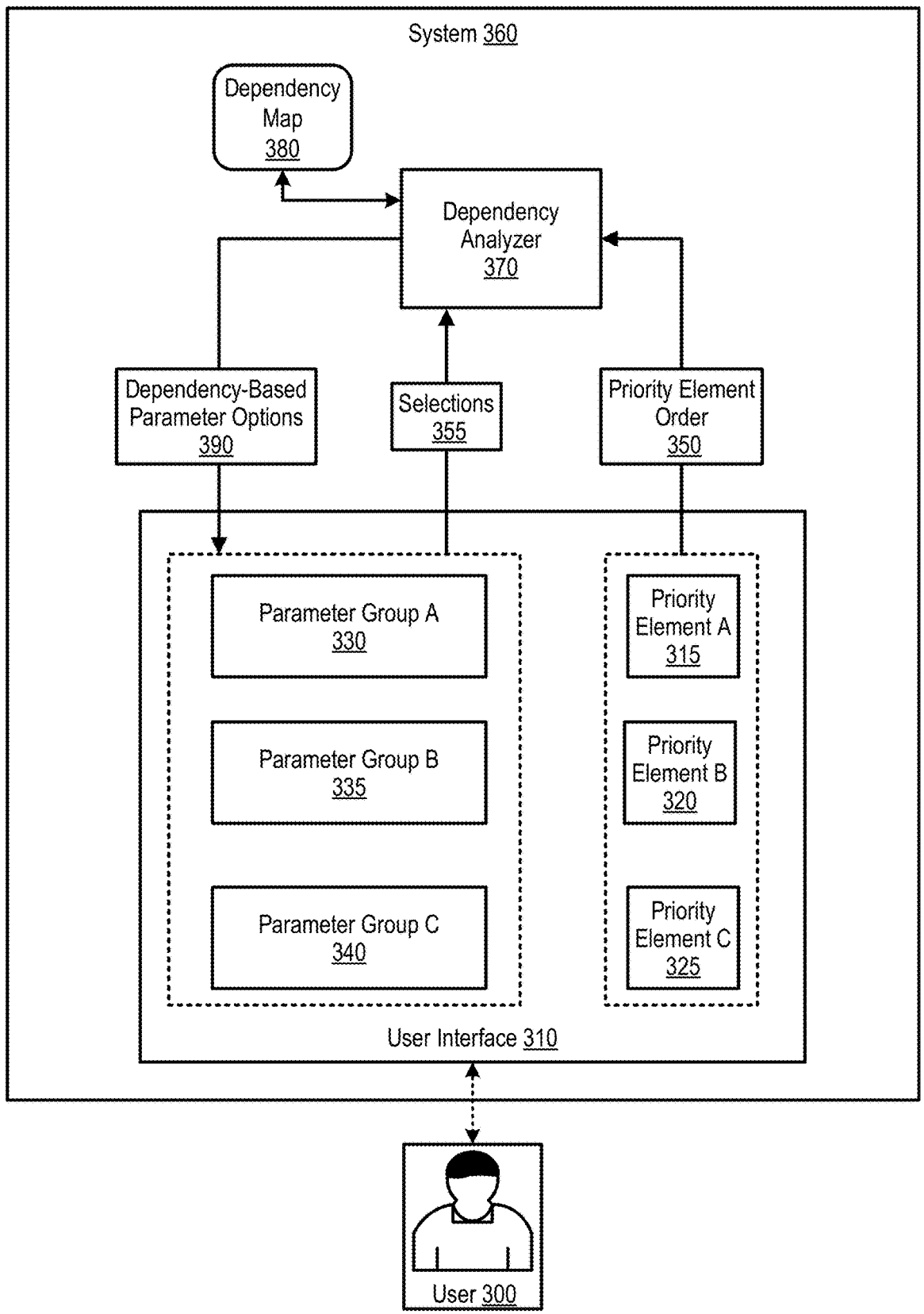
FIG. 3 is an exemplary diagram depicting a system that rearranges a user interface and removes dependency-based restrictions based on a user's priorities.

FIG. 3 is an exemplary diagram depicting a system that rearranges a user interface based on a user's priorities to remove dependency-based restrictions. As discussed herein, dependency-based restrictions are restrictions placed on parameter options based on parameter prioritization and prior parameter selections.

User 300 interacts with system 360 via user interface 310 that is displayed, for example, on display 130, to order a product or service. The product/service has three parameter groups A 330, B 335, and C 340, each of which including various parameter option selections. For example, if user 300 is ordering a computer, parameter group A 330 may provide a list of processor types, parameter group B 335 may include a list of memory sizes, and parameter group C 340 may include a list of screen sizes.

Parameter groups A 330, B 335, and C 340 are initially arranged according to an initial priority (e.g., default priority), and priority elements A 315, B 320, and C 325 are arranged in the same initial priority. As discussed herein, user 300 is able to rearrange priority elements A 315, B 320, and C 325 as needed when user 300 encounters dependency-based restrictions while ordering the computer. In one embodiment, user interface 310 does not include priority elements 315-225 and user 300 rearranges the specific parameter groups 330-340 as needed according to user 300's priorities.

Dependency analyzer 370 receives one or more selections 355 from user 300 (or uses default selections), and accesses dependency map 380 to determine whether dependency-based restrictions apply to other parameter groups based on the current selections and the current parameter priority. If dependency-based restrictions apply, dependency analyzer 370 adjusts parameter options to the restricted parameter groups via dependency-based parameter options 390. For example, user 300 may first select a lower performing processor in parameter group A 330 that limits the screen size selection in parameter group C 340 to only a 15 inch screen size option. This conflicts with user 300's top priority of having a 17 inch screen size.

When dependency-based restrictions impede user 300 from selecting parameter options matching user 300's requirements, user 300 rearranges priority elements 315-325 to move the priority parameters to a higher priority (e.g., screen size). Dependency analyzer 370 captures priority element order 350, repositions parameter groups 330-340, and applies dependency-based restrictions via dependency-based parameter options 390 based on dependency map 380. In turn, user 300 is able to select parameter options that match user 300's requirements as discussed herein and order the customized product/service (see FIGS. 4 through 7 and corresponding text for further details).

In one embodiment, system 360 is implemented with a front-end framework that includes HTML, CSS, and JavaScript rendered on modern web browsers. In this embodiment, a variety of implementations with JavaScript, HTML, and CSS enable user 300 to interact with user interface 310 and reorder products/services as needed. User 300's interactions may be a click and drag, selecting up and down arrows, entering a number, and etcetera.

In another embodiment, system 360 uses an optimization engine that analyzes usage patterns and metrics at scale and assigns a new default priority order on user interface 310 so that future usage is faster and simpler, such as moving the screen size parameter selection to the top.

In another embodiment, system 360 informs user 300 (e.g., hover message) detailing that a particular parameter section cannot be reordered or positioned up to a certain point due to, for example, technical feasibility or product availability. For example, a small bike company, while offering almost unrestricted custom bike configurations, is realistic in that delivering to different locations will take different amounts of time and cost depending on distance. In this example, the bike company requires that a user first put in their shipping address before the user can see the shipping cost or shipping time selections.

Figure 4:
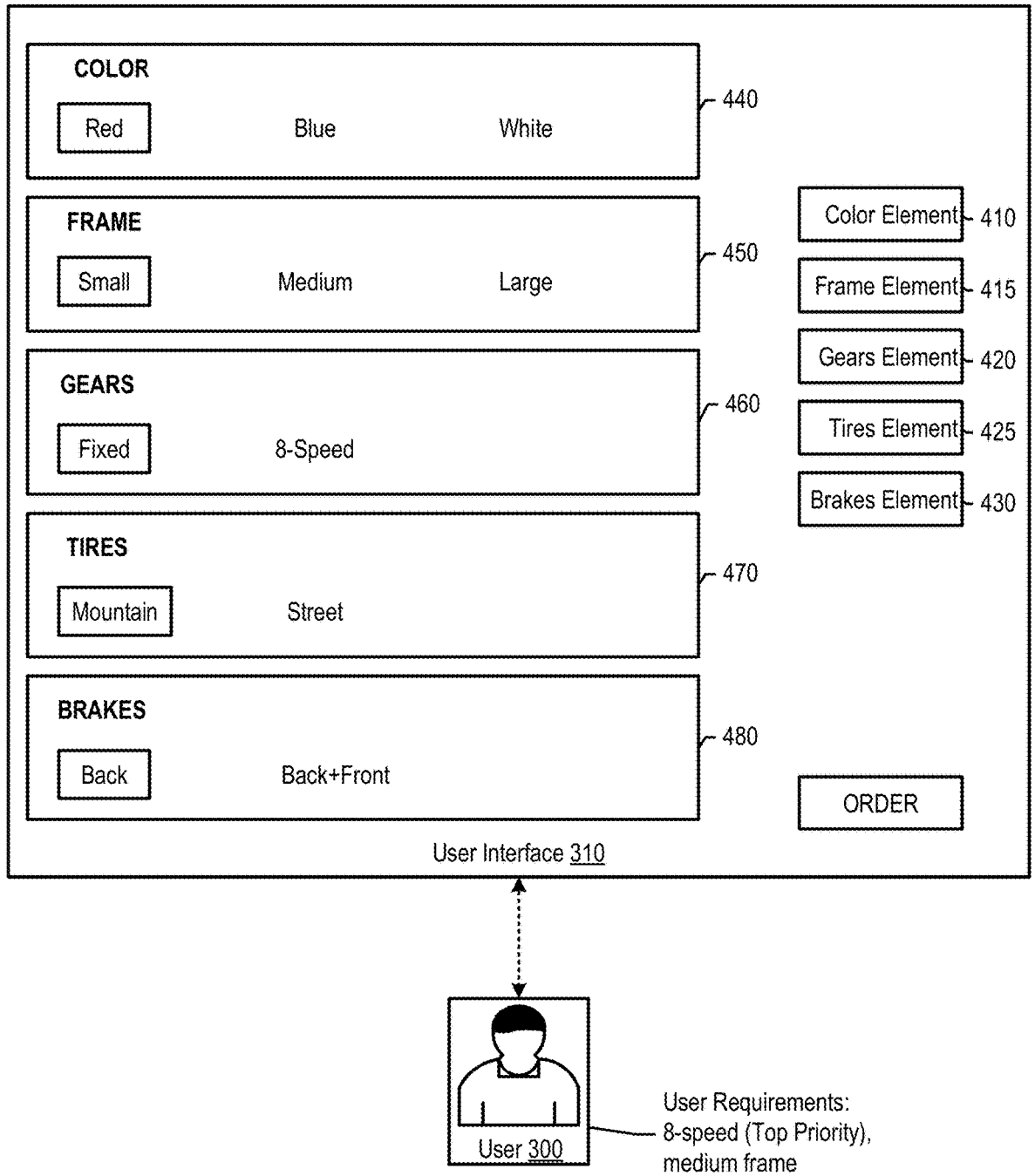
FIG. 4 is an exemplary diagram depicting a user using a user interface to order a product.

FIG. 4 is an exemplary diagram depicting user 300 using user interface 310 to order a bicycle. User 300 is presented with five parameter groups from which to select options, which are color parameter group 440, frame size parameter group 450, gears type parameter group 460, tires type parameter group 470, and brakes type parameter group 480. Parameter groups 440-480 are initially arranged according to an initial arrangement of corresponding priority elements 410, 415, 420, 425, and 430. FIG. 4 also shows initial, default option selections of the various parameter groups (red, small, fixed, mountain, and back).

User 300 has two bicycle requirements, which are 8-speed gears (top priority) and a medium frame. As discussed below, user 300 rearranges priority elements 410-430 as needed to order a bicycle that meets user 300's requirements (see FIGS. 5-7 and corresponding text for further details).

Figure 5:
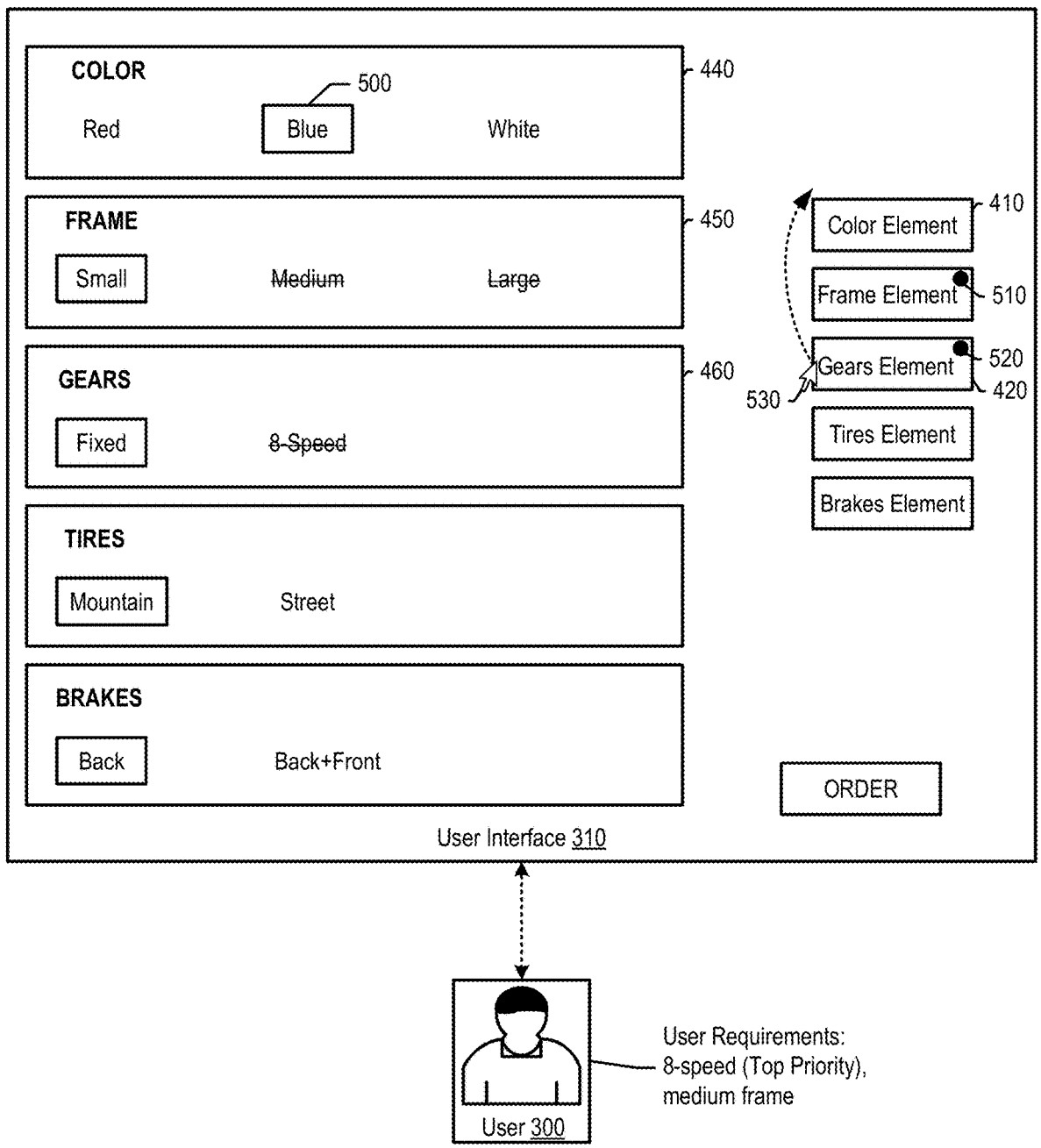
FIG. 5 is an exemplary diagram depicting a user performing an initial selection on a user interface based on an initial parameter group arrangement.

FIG. 5 is an exemplary diagram depicting user 300 performing an initial selection on user interface 310 based on an initial parameter group arrangement. User 300 makes selection 500 that selects "blue" as a color option for the bicycle. Dependency analyzer 370 assesses selection 500 against dependency map 380 and determines that there are dependency-based restrictions in frame size parameter group 450 and gears type parameter group 460 (see FIG. 8, mapping 800 and corresponding text for further details).

FIG. 5 shows that, by selecting "blue" as a color option, dependency map 380 imposes dependency-based restrictions where only a small frame is available in frame size parameter group 450 and only fixed gears are available in gears type parameter group 460. Dependency analyzer 370 highlights the dependency-based restrictions placed on particular parameter groups by adding restriction identifiers 510 and 520 to the corresponding priority elements.

Figure 6:
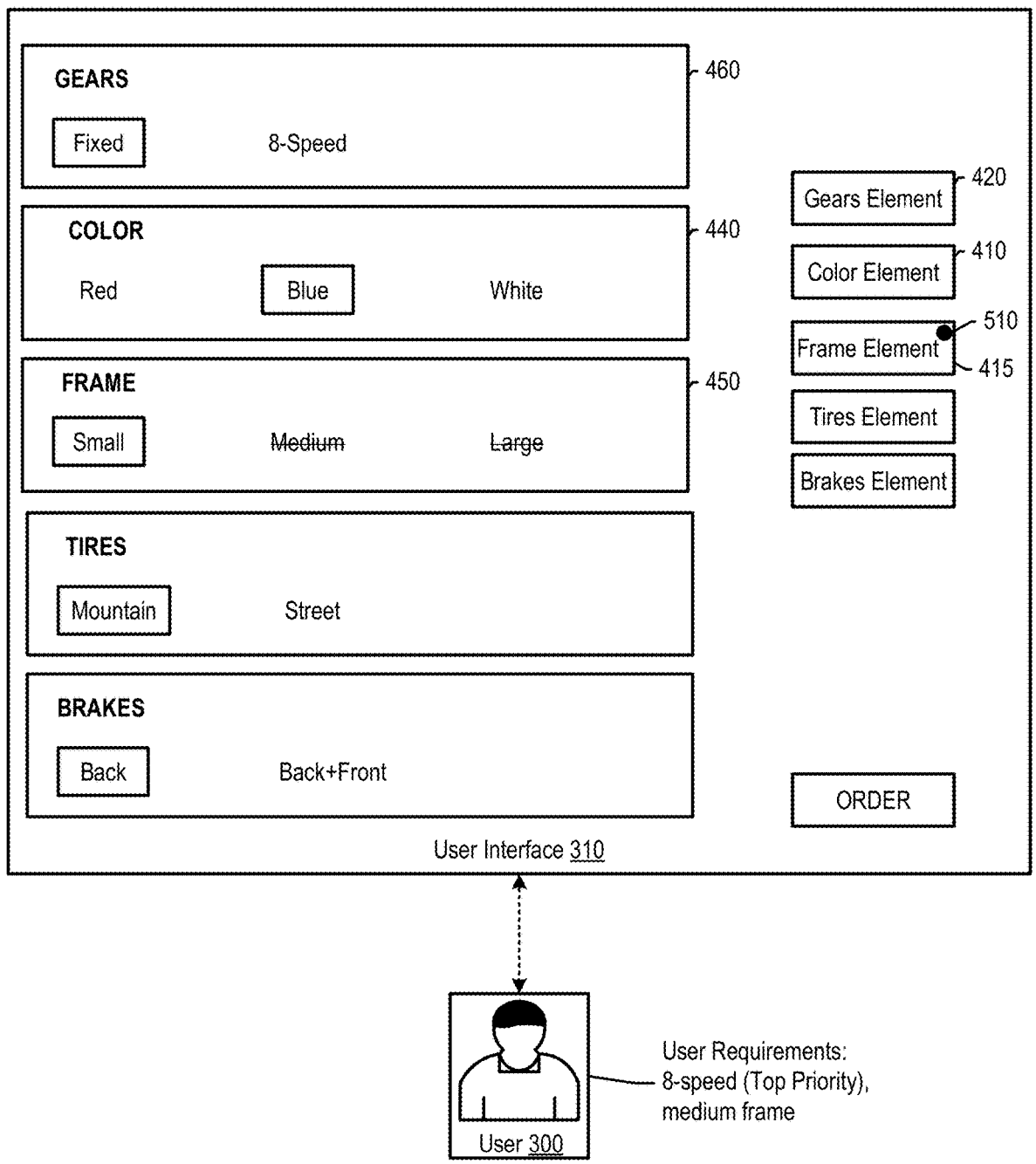
FIG. 6 is in exemplary diagram depicting parameter group readjustments on a user interface based on parameter element priority changes.

Due to the fact that user 300's requirements are an 8-speed bike with a medium frame, user 300 uses pointer 530 to move gears element 420 (top priority) above color element 410 to rearrange the priorities and move gears type parameter group 460 ahead of color parameter group 440 in priority (see FIG. 6 and corresponding text for further details).

FIG. 6 is in exemplary diagram depicting parameter group readjustments based on parameter element priority changes from FIG. 5. FIG. 6 shows that gears parameter group 460 is at the top of user interface 310 because gears element 420 is at the top of the priority elements from user 300's rearrangement in FIG. 5.

FIG. 6 shows that both fixed gears and 8-speed gears are now parameter options within gears type parameter group 460. FIG. 6 shows that frame parameter group 450 still has dependency-based restrictions based on the current parameter selections, which are also indicated by dependency-based restriction indicator 510. User 300 has two options at this point. The first option is that user 300 can move frame element 415 above color element 410 to see of the dependency-based restrictions are resolved if they are based on the current color selection. The second option is for user 300 to select "8-speed" as the gears parameter option, which is user 300's top priority, and see whether a dependency-based restriction restricts user 300 from selecting a medium frame size, which is user 300's second priority (see FIG. 7 and corresponding text for further details).

Figure 7:
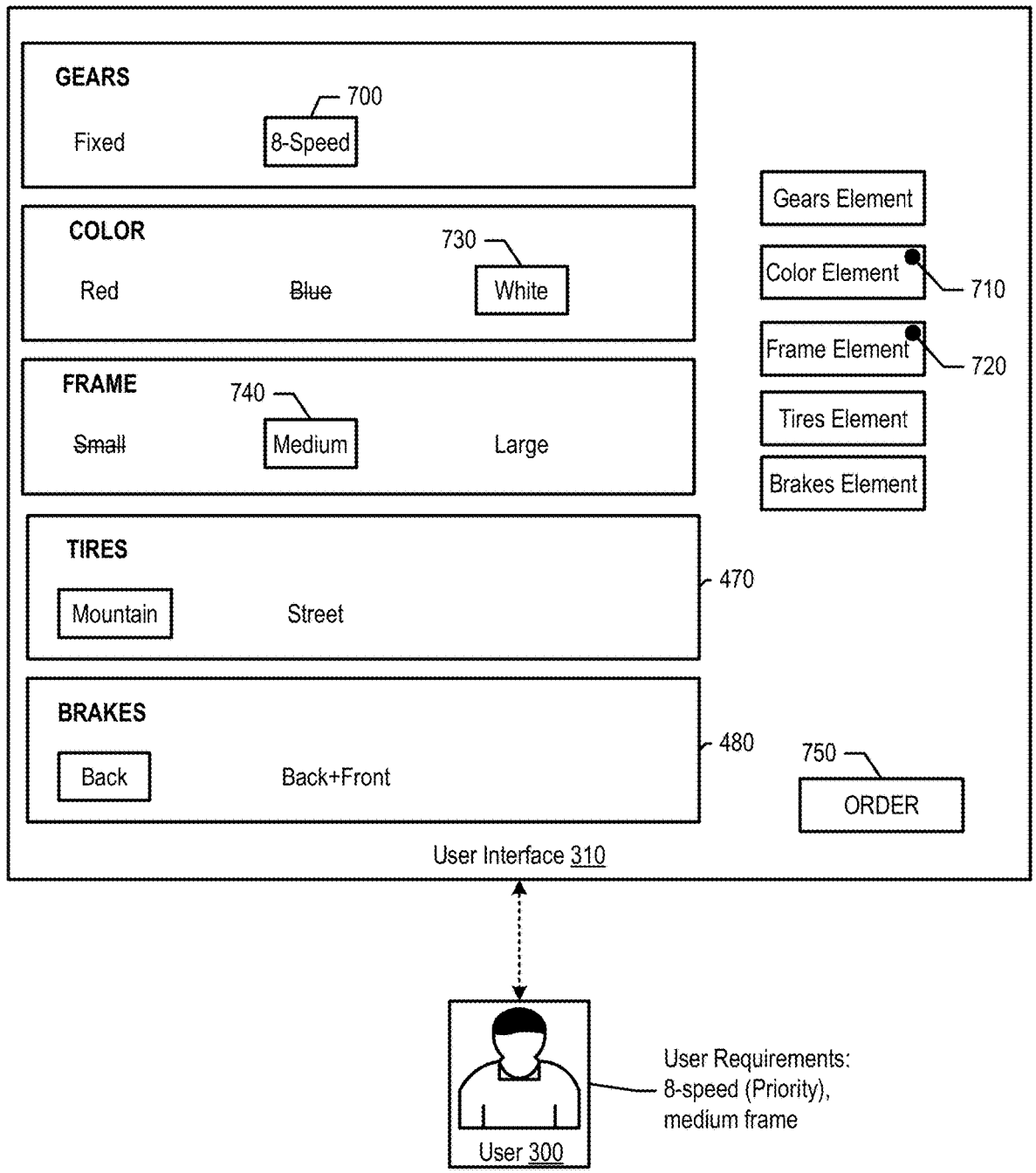
FIG. 7 is an exemplary diagram depicting a user selecting parameter options according to the user's priorities.

FIG. 7 is an exemplary diagram depicting user 300 selecting parameter options according to user 300's priorities. User 300 performs selection 700 to select "8-speed" gears for the bicycle, which is user 300's top priority. Dependency analyzer 370 uses dependency map 380 to determine whether dependency-based restrictions apply based on selection 700 and the priority order of the parameter groups (see FIG. 8, mapping 850 and corresponding text for further details).

Dependency analyzer 370 determines that color parameter option restrictions apply (red and blue options only) and frame parameter option restrictions apply (medium and large frame options only), as evidenced by restriction indicators 710 and 720. User 300 performs selection 730 to select a "white" bicycle and performs selection 740 to select a "medium" frame size. Now that user 300 is able to select user 300's highest priority options (8-speed gears, medium frame) user 300 selects button 750 to order the bicycle. Prior to ordering, user 300 may also select options from tires type parameter group 470 and brakes type parameter group 480.

Figure 8:
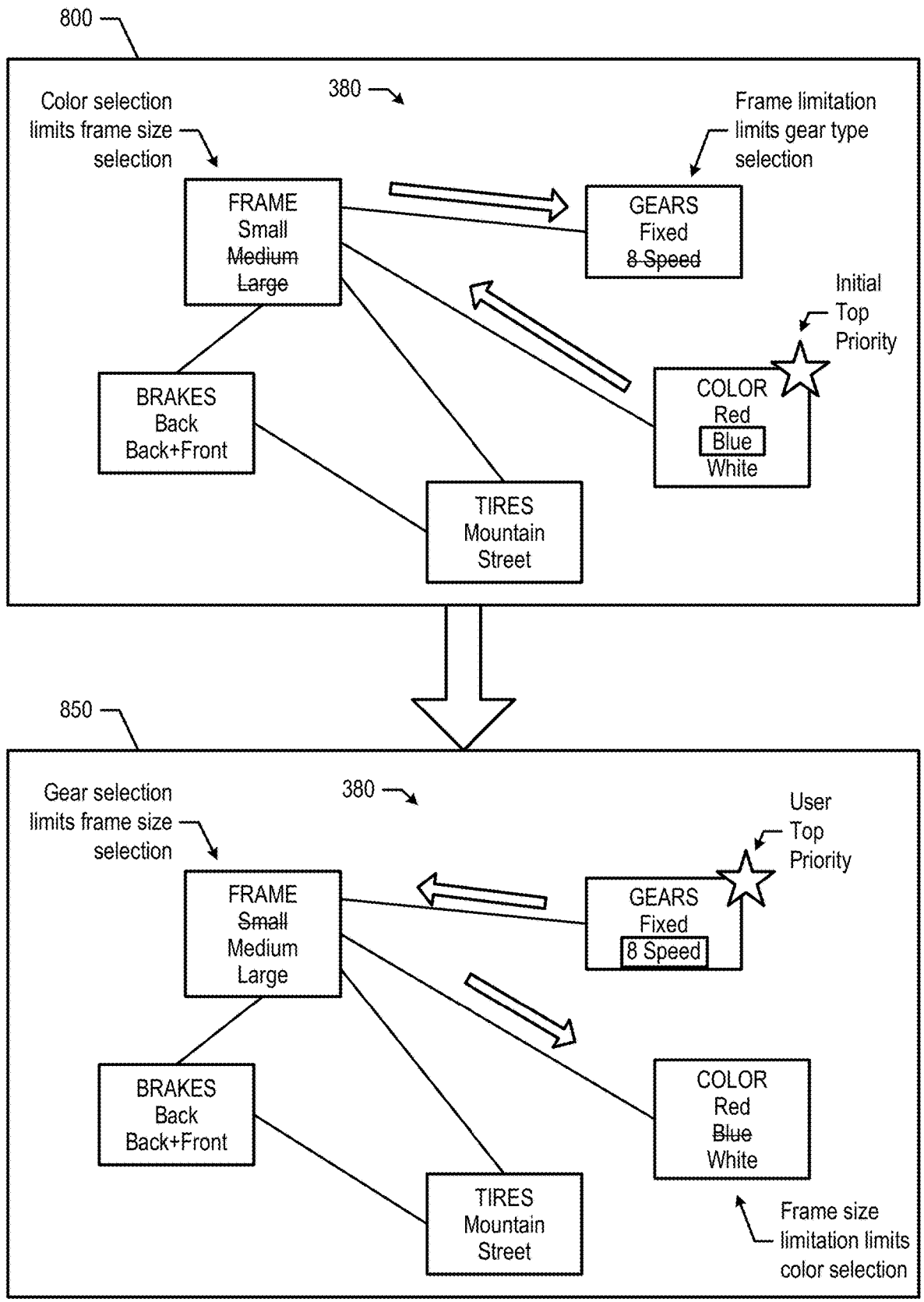
FIG. 8 is an exemplary diagram depicting two traversals of a dependency map based on two different parameter group priority orders.

FIG. 8 is an exemplary diagram depicting two traversals of dependency map 380 based on two different parameter group priority orders. Traversal 800 corresponds to initial parameter group priorities shown in FIG. 4 and shows that the color parameter group is the initial top priority. As such, the color selection imposes dependency-based restrictions, based on dependency map 380, which restricts the frame size to a small frame only. In addition, the small frame size restriction imposes a dependency-based restriction on the gears type selection that only allows a "fixed" gear selection.

Traversal 850 corresponds to FIG. 7 when user 300 rearranges the priority elements to have the gears parameter group as a top priority. When user 300 selects "8-speed," the gear selection imposes dependency-based restrictions, based on dependency map 380, that restrict the frame size to a medium or large frame. This dependency-based restriction is inconsequential because user 300 requires a medium frame. The medium or large frame size selection imposes a dependency-based restriction on the color selection that only allows a red or white color selection. Again, this dependency-based restriction is inconsequential because user 300 does not have a color requirement.

Figure 9:
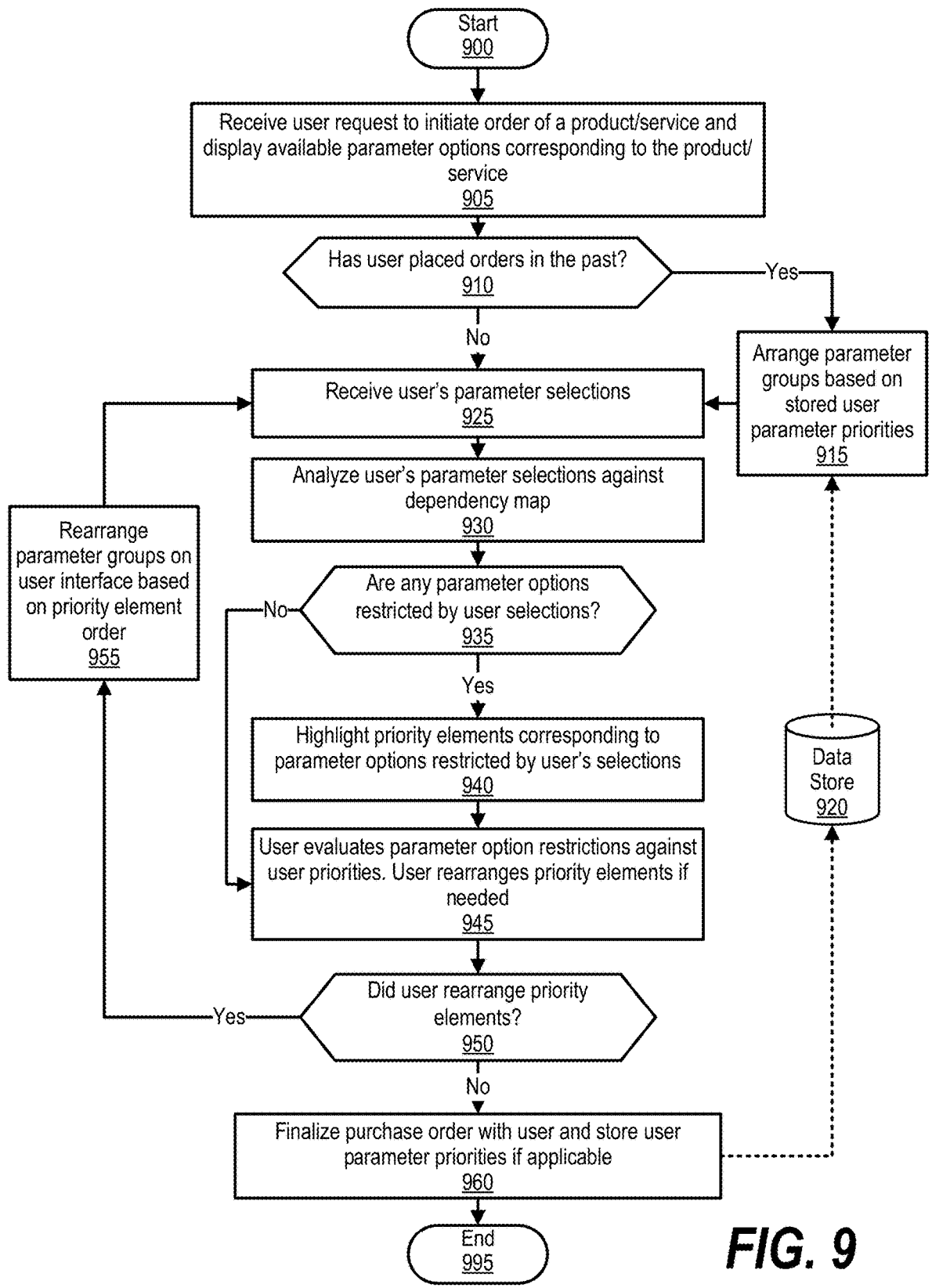
FIG. 9 is an exemplary flowchart showing steps taken to modify a user interface and apply dependency-based restrictions on parameter options based on user priorities and a dependency map.

FIG. 9 is an exemplary flowchart showing steps taken to modify a user interface and apply dependency-based restrictions on parameter options based on user priorities and a dependency map. FIG. 9 processing commences at 900 whereupon, at step 905, the process receives a user request to initiate an order of a product/service (e.g., buying a bicycle). In turn, the process displays user interface 310 on display 130 that includes available parameter options of the product/service based on an initial parameter group priority. In one embodiment, the process uses dependency map 380 to identify initial dependency-based restrictions and inhibits selections of various parameter options accordingly (see FIG. 4 and corresponding text for further details).

The process determines as to whether user 300 has placed orders in the past for the product or service (or similar products/services) (decision 910). If user 300 has placed orders for the product or service (or similar products/services) in the past, then decision 910 branches to the 'yes' branch whereupon, at step 915, the process retrieves stored priority settings from data store 920 corresponding to user 300 and arranges the parameter groups based on the stored priority settings. On the other hand, if user 300 has not placed orders for the product or service (or similar products/services) in the past, then decision 910 branches to the 'no' branch.

At step 925, the process receives user 300's initial parameter selections (selection 500 in FIG. 5) and, at step 930, the process analyzes user 300's initial parameter selections against dependency map 380 to determine if any dependency-based restrictions are applicable.

The process determines as to whether there are any parameter options restricted by the user selections according to any identified dependency-based restrictions (decision 935). If there are any parameter options restricted by user selections, then decision 935 branches to the 'yes' branch whereupon, at step 940, the process highlights priority elements corresponding to parameter options restricted by user 300's selections. In one embodiment, the process adds restriction identifiers to priority elements corresponding to priority groups that include restricted parameter options (restriction identifiers 510 and 520 in FIG. 5). In addition, in one embodiment, the process "strikes through" the restricted parameter options (see FIG. 5). In another embodiment, the process removes the restricted parameter options all together from user interface 310.

On the other hand, if the process does not identify any dependency-based restrictions corresponding to user 300's selection, then decision 935 branches to the 'no' branch bypassing step 940.

At step 945, user 300 evaluates whether any parameter options considered a priority to user 300 are impacted from the dependency-based restrictions (e.g., 8-speed gears). If there are any restricted priority parameter options, user 300 rearranges the priority elements accordingly (see pointer 530 in FIG. 5 and corresponding text for further details). In one embodiment, user 300 rearranges the parameter groups in order of priority.

The process determines as to whether user 300 rearranged the priority elements (decision 950). If user 300 rearranged the priority elements, then decision 950 branches to the 'yes' branch which loops back to rearrange the parameter groups on the user interface based on the new priority element order (step 955). This looping continues until user 300 does not wish to rearrange priority elements (or parameter groups) because user 300 is able to select parameter options that match user 300's requirements, at which point decision 950 branches to the 'no' branch exiting the loop.

At step 960, the process receives an order finalization request from user 300 (selection button 750) and stores the user parameter priorities in data store 920 for subsequent purchases if applicable. FIG. 9 processing thereafter ends at 995.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method implemented by an information handling system that includes a memory and a processor, the method comprising:
   automatically displaying a first priority element, a first parameter group, a second priority element, and a second parameter group concurrently on a user interface, wherein the first priority element is positioned ahead of the second priority element, and wherein the first parameter group and the second parameter group are selected from a plurality of parameter groups;
   arranging the first parameter group and the second parameter group in a first priority order on the user interface based upon the positioning of the first priority element and the second priority element;
   evaluating a selection of a first parameter option included in the first parameter group by traversing a dependency map comprising a plurality of dependency-based restrictions between the plurality of parameter groups, wherein the selection of the first parameter option generates a restriction on a second parameter option included in the second parameter group;
   providing, to a user, a restriction identifier on the second priority element based on the restriction to the second parameter option;
   receiving a user input from the user in response to providing the restriction identifier, wherein the user input moves the second priority element ahead of the first priority element;
   in response to receiving the user input that moves the second priority element ahead of the first priority element, automatically modifying the user interface by rearranging the first parameter group and the second parameter group into a second priority order;
   removing the restriction on the second parameter option based on the second priority order;
   in response to removing the restriction on the second parameter option, receiving a selection from the user that selects the second parameter option; and
   receiving an order placement from the user in response to the selection of the second parameter option.

2. The method of claim 1 further comprising:
   in response to determining that the user input moves the second priority element on top of the first priority element, moving the second parameter group ahead of the first parameter group.

3. The method of claim 1 further comprising:
   determining that a first one of the plurality of dependency-based restrictions places the restriction on the second parameter option in response to the selection of the first parameter option; and
   preventing a selection of the second parameter option based on the first dependency-based restriction.

4. The method of claim 3 further comprising:
   displaying a third parameter group on the user interface based on the first priority order;
   determining that a second one of the plurality of dependency-based restrictions places a different restriction on a third parameter option in the third parameter group based on a selection of a default parameter option included in the second parameter group; and
   restricting a selection of the third parameter option on the user interface based on the second dependency-based restriction.

5. The method of claim 1 further comprising:
   storing the second priority order as a default priority order in response to receiving the order placement.

6. The method of claim 5 further comprising:
   in response to storing the second priority order as the default priority order, receiving a user request to initiate a new order of a product;
   determining that the user request corresponds to the user; and
   in response to determining that the user request corresponds to the user, displaying the user interface based on the default priority order.

7. An information handling system comprising:
   one or more processors;
   a memory coupled to at least one of the one or more processors;
   a set of computer program instructions stored in the memory and executed by at least one of the one or more processors in order to perform actions of:
      automatically displaying a first priority element, a first parameter group, a second priority element, and a second parameter group concurrently on a user interface, wherein the first priority element is positioned ahead of the second priority element, and wherein the first parameter group and the second parameter group are selected from a plurality of parameter groups;
      arranging the first parameter group and the second parameter group in a first priority order on the user interface based upon the positioning of the first priority element and the second priority element;
      evaluating a selection of a first parameter option included in the first parameter group by traversing a dependency map comprising a plurality of dependency-based restrictions between the plurality of parameter groups, wherein the selection of the first parameter option generates a restriction on a second parameter option included in the second parameter group;
      providing, to a user, a restriction identifier on the second priority element based on the restriction to the second parameter option;
      receiving a user input from the user in response to providing the restriction identifier, wherein the user input moves the second priority element ahead of the first priority element;
      in response to receiving the user input that moves the second priority element ahead of the first priority element, automatically modifying the user interface by rearranging the first parameter group and the second parameter group into a second priority order;
      removing the restriction on the second parameter option based on the second priority order;
      in response to removing the restriction on the second parameter option, receiving a selection from the user that selects the second parameter option; and
      receiving an order placement from the user in response to the selection of the second parameter option.

8. The information handling system of claim 7 wherein at least one of the one or more processors perform additional actions comprising:

in response to determining that the user input moves the second priority element on top of the first priority element, moving the second parameter group ahead of the first parameter group.

9. The information handling system of claim 7 wherein at least one of the one or more processors perform additional actions comprising:
    determining that a first one of the plurality of dependency-based restrictions places the restriction on the second parameter option in response to the selection of the first parameter option; and
    preventing a selection of the second parameter option based on the first dependency-based restriction.

10. The information handling system of claim 9 wherein at least one of the one or more processors perform additional actions comprising:
    displaying a third parameter group on the user interface based on the first priority order;
    determining that a second one of the plurality of dependency-based restrictions places a different restriction on a third parameter option in the third parameter group based on a selection of a default parameter option included in the second parameter group; and
    restricting a selection of the third parameter option on the user interface based on the second dependency-based restriction.

11. The information handling system of claim 7 wherein at least one of the one or more processors perform additional actions comprising:
    storing the second priority order as a default priority order in response to receiving the order placement.

12. The information handling system of claim 11 wherein at least one of the one or more processors perform additional actions comprising:
    in response to storing the second priority order as the default priority order, receiving a user request to initiate a new order of a product;
    determining that the user request corresponds to the user; and
    in response to determining that the user request corresponds to the user, displaying the user interface based on the default priority order.

13. A computer program product stored in a computer readable storage medium, comprising computer program code that, when executed by an information handling system, causes the information handling system to perform actions comprising:
    automatically displaying a first priority element, a first parameter group, a second priority element, and a second parameter group concurrently on a user interface, wherein the first priority element is positioned ahead of the second priority element, and wherein the first parameter group and the second parameter group are selected from a plurality of parameter groups;
    arranging the first parameter group and the second parameter group in a first priority order on the user interface based upon the positioning of the first priority element and the second priority element;
    evaluating a selection of a first parameter option included in the first parameter group by traversing a dependency map comprising a plurality of dependency-based restrictions between the plurality of parameter groups, wherein the selection of the first parameter option generates a restriction on a second parameter option included in the second parameter group;
    providing, to a user, a restriction identifier on the second priority element based on the restriction to the second parameter option;
    receiving a user input from the user in response to providing the restriction identifier, wherein the user input moves the second priority element ahead of the first priority element;
    in response to receiving the user input that moves the second priority element ahead of the first priority element, automatically modifying the user interface by rearranging the first parameter group and the second parameter group into a second priority order;
    removing the restriction on the second parameter option based on the second priority order;
    in response to removing the restriction on the second parameter option, receiving a selection from the user that selects the second parameter option; and
    receiving an order placement from the user in response to the selection of the second parameter option.

14. The computer program product of claim 13 wherein the information handling system performs further actions comprising:
    in response to determining that the user input moves the second priority element on top of the first priority element, moving the second parameter group ahead of the first parameter group.

15. The computer program product of claim 13 wherein the information handling system performs further actions comprising:
    determining that a first one of the plurality of dependency-based restrictions places the restriction on the second parameter option in response to the selection of the first parameter option; and
    preventing a selection of the second parameter option based on the first dependency-based restriction.

16. The computer program product of claim 15 wherein the information handling system performs further actions comprising:
    displaying a third parameter group on the user interface based on the first priority order;
    determining that a second one of the plurality of dependency-based restrictions places a different restriction on a third parameter option in the third parameter group based on a selection of a default parameter option included in the second parameter group; and
    restricting a selection of the third parameter option on the user interface based on the second dependency-based restriction.

17. The computer program product of claim 13 wherein the information handling system performs further actions comprising:
    storing the second priority order as a default priority order in response to receiving the order placement;
    in response to storing the second priority order as the default priority order, receiving a user request to initiate a new order of a product;
    determining that the user request corresponds to the user; and
    in response to determining that the user request corresponds to the user, displaying the user interface based on the default priority order.

* * * * *